US006532193B1

(12) United States Patent
Fehse et al.

(10) Patent No.: US 6,532,193 B1
(45) Date of Patent: Mar. 11, 2003

(54) ULTRASOUND SENSOR

(75) Inventors: Meike Fehse, Leonberg (DE); Martin Noll, Muggensturm (DE); Peter Rapps, Karlsruhe (DE); Waldemar Ernst, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/581,957

(22) PCT Filed: Dec. 14, 1998

(86) PCT No.: PCT/DE98/03655

§ 371 (c)(1),
(2), (4) Date: Aug. 22, 2000

(87) PCT Pub. No.: WO99/31526

PCT Pub. Date: Jun. 24, 1999

(30) Foreign Application Priority Data

Dec. 15, 1997 (DE) .......................................... 197 55 729

(51) Int. Cl.[7] ......................... G01C 7/521; G10K 11/00
(52) U.S. Cl. ........................ 367/140; 367/188; 310/338
(58) Field of Search .......................... 310/338; 367/140, 367/173, 172, 188; 73/570, 290 V

(56) References Cited

U.S. PATENT DOCUMENTS

| | | | | | |
|---|---|---|---|---|---|
| 4,281,404 | A | | 7/1981 | Morrow, Jr. et al. | |
| 4,745,893 | A | * | 5/1988 | Atherton et al. | 123/196 S |
| 5,043,954 | A | | 8/1991 | Takeoka et al. | |
| 5,363,341 | A | * | 11/1994 | Schwald et al. | 367/173 |
| 5,617,866 | A | | 4/1997 | Marian, Jr. et al. | |
| 5,648,697 | A | * | 7/1997 | Pirrung et al. | 310/338 |
| 5,659,423 | A | * | 8/1997 | Schierbeek et al. | 359/604 |

FOREIGN PATENT DOCUMENTS

| | | |
|---|---|---|
| DE | 36 21 819 | 2/1988 |
| EP | 0 792 094 | 8/1997 |

* cited by examiner

*Primary Examiner*—Ian J. Lobo
(74) *Attorney, Agent, or Firm*—Kenyon & Kenyon

(57) ABSTRACT

In an ultrasonic sensor, including a housing having a plug connector, an ultrasonic converter, and a circuit board, the housing is divided into a support and a hood enclosing the support. The support carries the circuit board, the plug connector, and the ultrasonic converter.

8 Claims, 1 Drawing Sheet

ULTRASOUND SENSOR

FIELD OF THE INVENTION

The present invention relates to an ultrasonic sensor, including a housing having a plug connector, an ultrasonic converter, and a circuit board.

BACKGROUND INFORMATION

Ultrasonic sensors, which are used in the automobile industry for distance measurement, are usually sealed against damaging external influences by way of an encapsulating compound. For that purpose, the sensors are encapsulated in a complex bottom-encapsulation method, and cured in an oven. In modern ultrasonic sensors it is common to use cup-shaped ultrasonic converters that comprise an annular wall and a membrane-like bottom.

SUMMARY OF THE INVENTION

It is an object of the present invention to provide an ultrasonic sensor that is compact and that can be easily and cheaply assembled and encapsulated.

In an ultrasonic sensor according to the present invention, the housing is divided into a support and a hood enclosing the support; and the support carries the circuit board, the plug connector, and the ultrasonic converter. This has the advantage that even after preassembly, all the components are freely accessible and can be inspected.

In an embodiment of the present invention, provision is preferably made for the ultrasonic sensor to be completely filled with encapsulating compound and is sealed. It is thereby protected from external influences.

A further advantageous embodiment of the ultrasonic sensor according to the present inventing involves the fact that the circuit board with circuit elements, mounted on the support, is accessible from both sides when the hood has not yet been installed. The circuit on the circuit board can thus easily be adjusted and checked, and any corrections can easily be made.

In an exemplary embodiment of the present invention, provision is made for the support to possess an annular receptacle for the ultrasonic converter, and for the plug connector to be shaped onto the support, the plug connector being joined to the receptacle by struts. The support can thus very easily be populated, since the parts of the ultrasonic sensor already installed are immobilized during installation of the remaining parts on the support.

A further advantageous embodiment of the present invention lies in the fact that two struts are shaped laterally onto the support, and the circuit board is installed between them. As a result, the ultrasonic sensor is very compact and the circuit board is mechanically well protected.

In an embodiment of the present invention, provision is made for the hood to be slid along the struts over the support. The encapsulating process is thereby simplified, since the hood remains immobilized during encapsulation and cannot slip.

In a further embodiment of the present invention, provision is made for the hood itself to be open at two sides butting against one another. This eliminates the complex bottom-encapsulation process of conventional sensors; after assembly, the ultrasonic sensor can easily be encapsulated from above.

A further advantageous embodiment of the present invention lies in the fact that one open side of the hood is closed off by a flange shaped onto the support. This simplifies manufacture, since the encapsulating compound requires no additional mold while curing. A mechanically durable join also results.

In an advantageous embodiment of the present invention, provision is made for the ultrasonic converter to be immobilized on the support with a retaining cap. This also simplifies assembly, since the ultrasonic converter is thereby immobilized, and provides a sealed join with the support.

BRIEF DESCRIPTION OF THE DRAWINGS

Identical parts are labeled in the Figures with identical reference characters. The Figures show the exemplary embodiment in various stages of assembly. The emission and reception side is on the left in each case.

Figure 1:
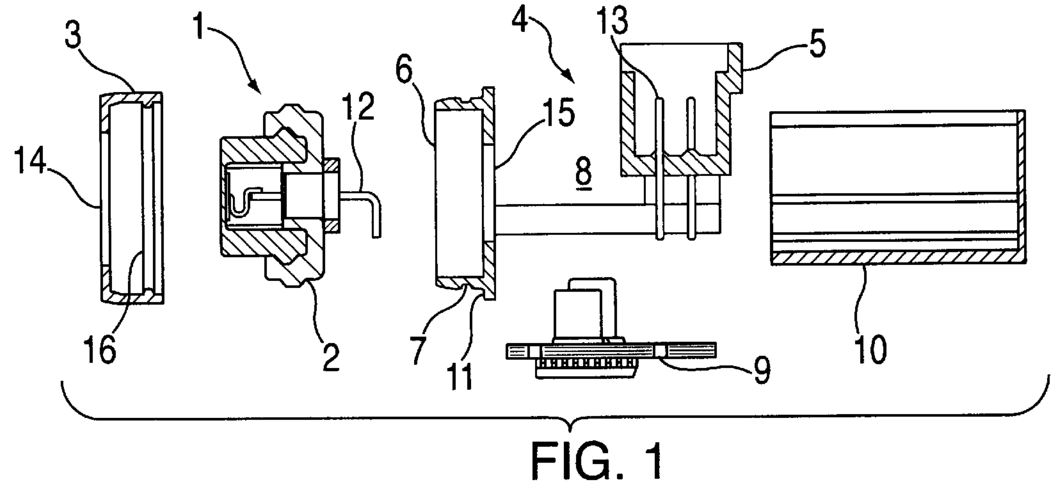
FIG. 1 shows, as an exploded drawing, the individual parts of a complete ultrasonic sensor.

The ultrasonic sensor depicted comprises an ultrasonic converter 1 having a flexible decoupling ring 2 and a retaining cap 3. The converter itself contains a mechanism with which ultrasonic waves can be generated from electrical signals, received, and converted into electrical signals. Since the ultrasonic converter is a sensitive oscillating system, it must be decoupled from the rest of the ultrasonic sensor and mounted in vibration-damped fashion in the ultrasonic sensor. Decoupling ring 2 is provided for this purpose. In addition to a sealing function, it also provides damping of undesired vibrations.

Support 4 comprises a plug connector 5, an annular receptacle 6 for ultrasonic converter 1 having a snap-lock groove 7 for retaining cap 3, and two joining struts 8 which join receptacle 6 of ultrasonic converter 1 to plug connector 5. After ultrasonic converter 1 and circuit board 9 have been assembled, support 4 is slid, like a drawer, into hood 10 up to a flange 11 which closes off the hood on one side. Also depicted are passthroughs for ultrasonic converter 1 in the retaining cap 14 and in the support 45, and a snap-lock tab 16 in retaining cap 3.

Figure 2:
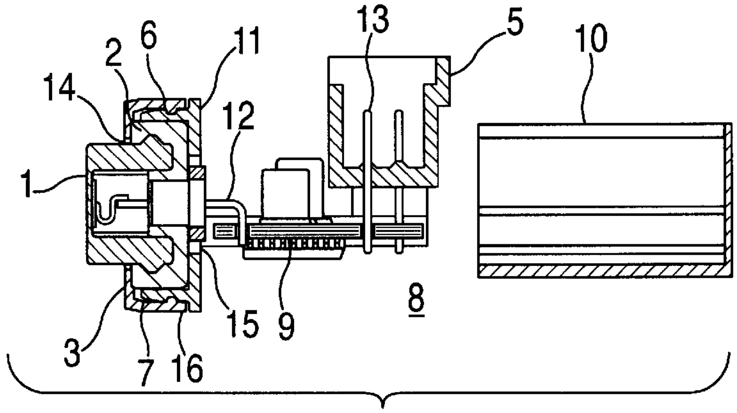
FIG. 2 shows the preassembled ultrasonic sensor before the hood is slid onto the support.

FIG. 2 depicts the ultrasonic sensor in a state in which it is completely preassembled. Ultrasonic converter 1 is attached to support 4 with retaining cap 3 in its receptacle 6. Circuit board 9 is connected to the connecting lines 12 of the ultrasonic converter 1 and the plug contacts 13, and immobilized in support 4.

Figure 3:
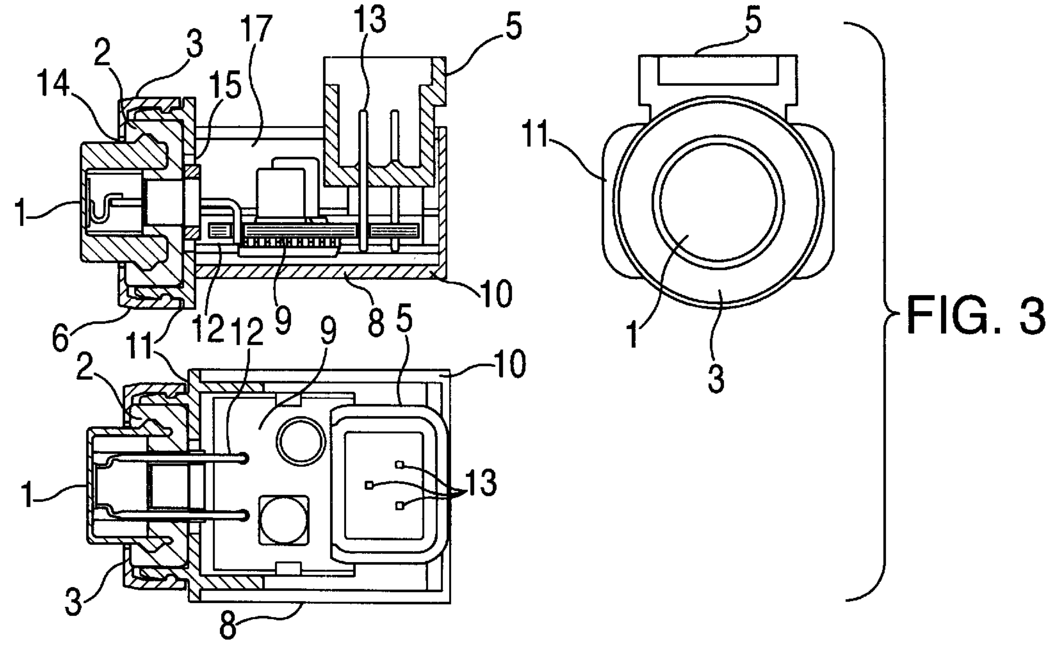
FIG. 3 shows the completed ultrasonic sensor.

After inspection and adjustment of the circuit on circuit board 9, hood 10 is slid over support 4 and the ultrasonic sensor is completely filled with encapsulating compound so that it is sealed against environmental influences. Encapsulating compound 17 (FIG. 3) fills up all the cavities in the ultrasonic converter and around the circuit board, and ensures mechanically durable and sealed encapsulation of the ultrasonic sensor.

What is claimed is:

1. An ultrasonic sensor comprising:

an ultrasonic converter;

a circuit board; and a housing including a plug connector, the housing being divided into a support and a hood enclosing the support, the support carrying the circuit board, the plug connector and the ultrasonic converter, wherein the ultrasonic sensor is completely filled with an encapsulating compound and is sealed.

2. An ultrasonic sensor comprising:

an ultrasonic converter;

a circuit board; and a housing including a plug connector, the housing being divided into a support and a hood enclosing the support, the support carrying the circuit board, the plug connector and the ultrasonic converter, wherein the circuit board includes circuit elements, the circuit board being accessible from both of two sides when the hood has not yet been installed.

3. The ultrasonic sensor according to claim 1, wherein the support includes an annular receptacle for the ultrasonic converter, the plug connector being shaped onto the support, the plug connector being joined to the receptacle by struts.

4. The ultrasonic sensor according to claim 3, wherein two of the struts are shaped laterally onto the support, the circuit board being situated between the two struts.

5. The ultrasonic sensor according to claim 3, wherein the hood is slid along the struts over the support.

6. The ultrasonic sensor according to claim 1, wherein the hood is open at two sides butting against one another.

7. The ultrasonic sensor according to claim 6, wherein one of the two open sides of the hood is closed off by a flange shaped onto the support.

8. The ultrasonic sensor according to claim 2, further comprising a retaining cap for immobilizing the ultrasonic converter on the support.

* * * * *

UNITED STATES PATENT AND TRADEMARK OFFICE

CERTIFICATE OF CORRECTION

PATENT NO. : 6,532,193 B1

DATED : March 11, 2003

INVENTOR(S) : Febse et al.

It is certified that error appears in the above-identified patent and that said Letters Patent is hereby corrected as shown below:

Column 1,
Line 35, change “present inventing” to -- present invention --.

Column 2,
Line 18, insert -- DETAILED DESCRIPTION --.
Line 41, change “support 45” to -- support 15 --.

Column 3,
Line 12, change “claim 1” to -- claim 2 --.

Column 4,
Line 6, change “claim 1” to -- claim 2 --.

Signed and Sealed this

Twenty-seventh Day of January, 2004

JON W. DUDAS

*Acting Director of the United States Patent and Trademark Office*